US012718514B2

(12) United States Patent
Tan

(10) Patent No.: US 12,718,514 B2
(45) Date of Patent: Aug. 25, 2026

(54) IMAGE FUSING METHOD AND APPARATUS BASED ON IMAGE TEMPLATE, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Yang Tan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 283 days.

(21) Appl. No.: 18/527,970

(22) Filed: Dec. 4, 2023

(65) Prior Publication Data

US 2024/0104696 A1 Mar. 28, 2024

Related U.S. Application Data

(63) Continuation of application No. PCT/CN2022/137131, filed on Dec. 7, 2022.

(30) Foreign Application Priority Data

Mar. 14, 2022 (CN) ........................ 202210259239.5

(51) Int. Cl.
*G06T 5/50* (2006.01)
*G06T 5/70* (2024.01)
(Continued)

(52) U.S. Cl.
CPC ................. *G06T 5/50* (2013.01); *G06T 5/70* (2024.01); *G06T 7/12* (2017.01); *G06V 10/26* (2022.01);
(Continued)

(58) Field of Classification Search
None
See application file for complete search history.

(56) References Cited

U.S. PATENT DOCUMENTS

2007/0237421 A1 10/2007 Luo et al.
2011/0158537 A1 6/2011 Uno
(Continued)

FOREIGN PATENT DOCUMENTS

CN 109801249 A 5/2019
CN 110399849 A 11/2019
(Continued)

OTHER PUBLICATIONS

The European Patent Office (EPO) The Extended European Search Report for Application No. 22931837.3, Jun. 11, 2025 9 Pages.
(Continued)

*Primary Examiner* — Lennin R Rodriguezgonzalez
(74) *Attorney, Agent, or Firm* — Anova Law Group, PLLC

(57) ABSTRACT

This application discloses an image processing method and apparatus, a storage medium, an electronic device, and a product, and relates to the field of computer technology. This application can be applied to the technical fields of artificial intelligence, a map vehicle network, and a blockchain. The method includes acquiring a pre-set image template, the pre-set image template comprising an image pre-synthesis area, and the image pre-synthesis area being used for synthesizing a predetermined type of image content; identifying a target image file; performing synthesis pre-processing on target image content in the target image file to generate an image to be synthesized, the target image content being the predetermined type of image content; and fusing the image to be synthesized to the image pre-synthesis area to generate a target image.

20 Claims, 11 Drawing Sheets

(51) Int. Cl.

| | |
|---|---|
| ***G06T 7/12*** | (2017.01) |
| ***G06V 10/26*** | (2022.01) |
| ***G06V 10/30*** | (2022.01) |
| ***G06V 10/44*** | (2022.01) |
| ***G06V 10/75*** | (2022.01) |
| ***G06V 10/77*** | (2022.01) |
| *G06V 10/94* | (2022.01) |

(52) U.S. Cl.
CPC ............ *G06V 10/30* (2022.01); *G06V 10/443* (2022.01); *G06V 10/751* (2022.01); *G06V 10/7715* (2022.01); *G06T 2200/24* (2013.01); *G06T 2207/20021* (2013.01); *G06T 2207/20048* (2013.01); *G06T 2207/20221* (2013.01); *G06V 10/945* (2022.01)

(56) References Cited

U.S. PATENT DOCUMENTS

| | | | |
|---|---|---|---|
| 2015/0331888 | A1 | 11/2015 | Shomair |
| 2021/0232806 | A1 | 7/2021 | He et al. |

FOREIGN PATENT DOCUMENTS

| | | | |
|---|---|---|---|
| CN | 111640166 | A | 9/2020 |
| CN | 111968134 | A | 11/2020 |
| CN | 112102340 | A | 12/2020 |
| CN | 112215123 | A | 1/2021 |
| CN | 112750176 | A | 5/2021 |
| CN | 112949360 | A | 6/2021 |
| CN | 113240679 | A | 8/2021 |
| CN | 113989814 | A | 1/2022 |
| CN | 114004905 | A | 2/2022 |
| WO | 2021134311 | A1 | 7/2021 |

OTHER PUBLICATIONS

Anonymous: "Upsampling—Wikipedia", Nov. 22, 2021 (Nov. 22, 2021), pp. 1-3, https://en.wikipedia.org/w/index.php?title=Upsampling&oldid=1056557822.

The World Intellectual Property Organization (WIPO) International Search Report for PCT/CN2022/137131 Dec. 7, 2022 5 pages (including English translation).

Janumala Akhilendra, MNN/README.md, https://github.com/alibaba/MNN/blob/master/README.md.

The State Intellectual Property Office of the People's Republic of China (SIPO) Office Action 1 for 202210259239.5 Jun. 4, 2024 10 Pages (including translation).

The State Intellectual Property Office of the People's Republic of China (SIPO) Office Action 2 for 202210259239.5 Jul. 2, 2024 9 Pages (including translation).

IMAGE FUSING METHOD AND APPARATUS BASED ON IMAGE TEMPLATE, STORAGE MEDIUM, AND ELECTRONIC DEVICE

RELATED APPLICATIONS

This application is a continuation application of PCT Application No. PCT/CN2022/137131, filed on Dec. 7, 2022, which in turn claims priority to Chinese Patent Application No. 202210259239.5, entitled "IMAGE PROCESSING METHOD AND APPARATUS, STORAGE MEDIUM, ELECTRONIC DEVICE, AND PRODUCT", filed to China National Intellectual Property Administration on Mar. 14, 2022. The two applications are incorporated by reference in their entirety.

FIELD OF THE TECHNOLOGY

This application relates to the field of computer technology, and in particular, to an image processing method and apparatus, a storage medium, an electronic device, and a product.

BACKGROUND OF THE DISCLOSURE

Image processing refers to performing post-processing on a target image file, for example, performing post-processing on an image in a photo album of a mobile phone. In existing image processing schemes, there is a way of simply applying an image style of a template to an image to be processed. If there is target image content in the image to be processed, an image style of a template will be applied to the image to be processed simply and directly. As such, the image style in the template and the target image content are isolated from each other. It is equivalent to adding a special effect of a mask, and an integrated fusion effect of placing the target image content in the image style cannot be achieved.

Therefore, the integrated fusion of the template and the content in the image file to be processed cannot be achieved accurately and effectively, resulting in poor image processing effect.

SUMMARY

The embodiments of this application provide an image processing method and apparatus, a storage medium, an electronic device, and a product. The integrated fusion of a target image file to be processed and the content in a pre-set image template can be achieved accurately and effectively, and the image processing effect can be effectively improved.

In order to solve the above technical problem, the embodiments of this application provide the following technical solutions.

An image processing method includes The method includes acquiring a pre-set image template, the pre-set image template comprising an image pre-synthesis area, and the image pre-synthesis area being used for synthesizing a predetermined type of image content; identifying a target image file; performing synthesis pre-processing on target image content in the target image file to generate an image to be synthesized, the target image content being the predetermined type of image content; and fusing the image to be synthesized to the image pre-synthesis area to generate a target image.

A non-transitory computer-readable storage medium stores thereon a computer program which, when executed by a processor of a computer, causes the computer to perform the method described in the embodiments of this application.

An electronic device includes: a memory, the memory storing a computer program; and a processor, the processor reading the computer program stored in the memory to perform the method described in the embodiments of this application.

DESCRIPTION OF EMBODIMENTS

Figure 1:
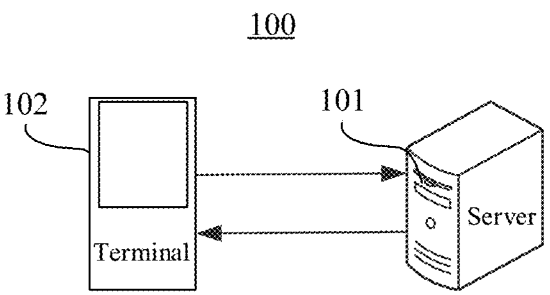
FIG. 1 shows a schematic diagram of a system that can be implemented as an embodiment of this application.

FIG. 1 shows a schematic diagram of system 100 that can be apply an embodiment of this application. As shown in FIG. 1, system 100 may include a server 101 and/or a terminal 102.

The server 101 may be an independent physical server, or may be a server cluster or a distributed system of a plurality of the physical servers, or may be a cloud server providing basic cloud computing services, such as cloud service, cloud database, cloud computing, cloud function, cloud storage, network service, cloud communication, middleware service, domain name service, CDN, and big data and AI platforms.

The terminal 102 may be any device. The terminal 102 includes, but is not limited to, a mobile phone, a personal computer, an intelligent voice interaction device, an intelligent household appliance, and a vehicle-mounted terminal, a VR/AR device, smart watch, and a computer.

It will be easily appreciated that the image processing method of this application may be performed by the computer device, and the computer device may be the server 101 or the terminal 102 described above.

In one embodiment, the terminal 102 or the server 101 may: acquire a pre-set image template, the pre-set image template including an image pre-synthesis area and template image content, and the image pre-synthesis area being used for synthesizing a predetermined type of image content; determining a target image file to be processed; perform synthesis pre-processing on target image content to be processed in the target image file to generate an image to be synthesized in response to that the target image file includes the target image content to be processed, the target image content to be processed being content satisfying a requirement of synthesizing the predetermined type of image content; and fuse the image to be synthesized to the image pre-synthesis area to generate a target image fusing the template image content and the target image content to be processed.

In one embodiment, when a user synthesizes a target image using a terminal, the terminal 102 may: present an image synthesis interface, the image synthesis interface displaying a pre-set image template, the pre-set image template including an image pre-synthesis area and template image content, and the image pre-synthesis area being used for synthesizing a predetermined type of image content; and present a synthesized target image in response to a synthesis operation in the image synthesis interface, the target image being generated by fusing an image to be synthesized to the image pre-synthesis area, the image to be synthesized being generated by performing synthesis pre-processing on target image content to be processed in a target image file, the image to be synthesized only having the target image content to be processed, and the target image content to be processed satisfying a requirement of synthesizing the predetermined type of image content.

Figure 2A:
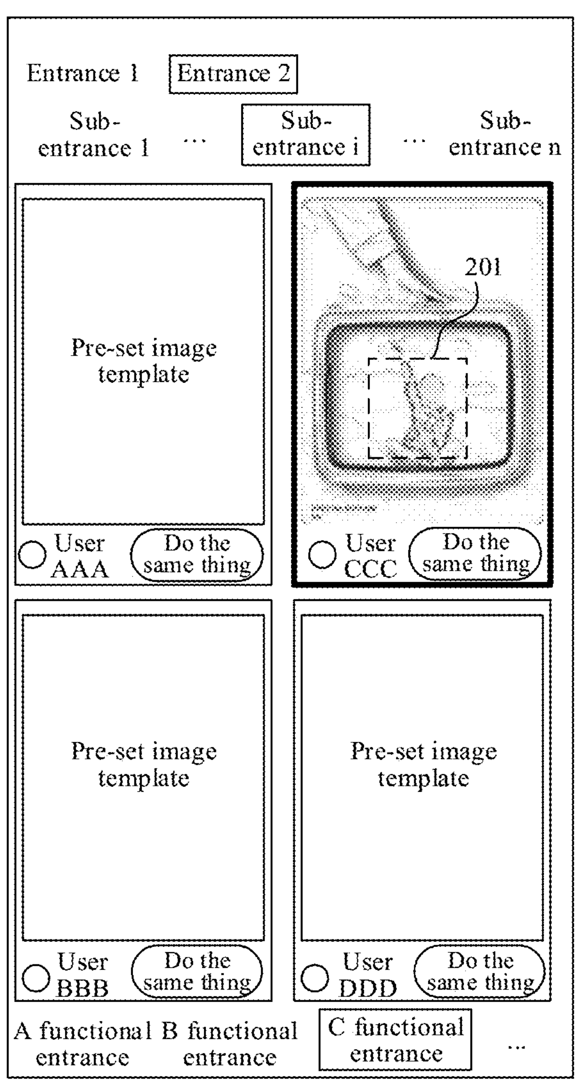
FIG. 2A to FIG. 2C show diagrams of terminal interface changes in a process of image processing In one embodiment.
Figure 2B:
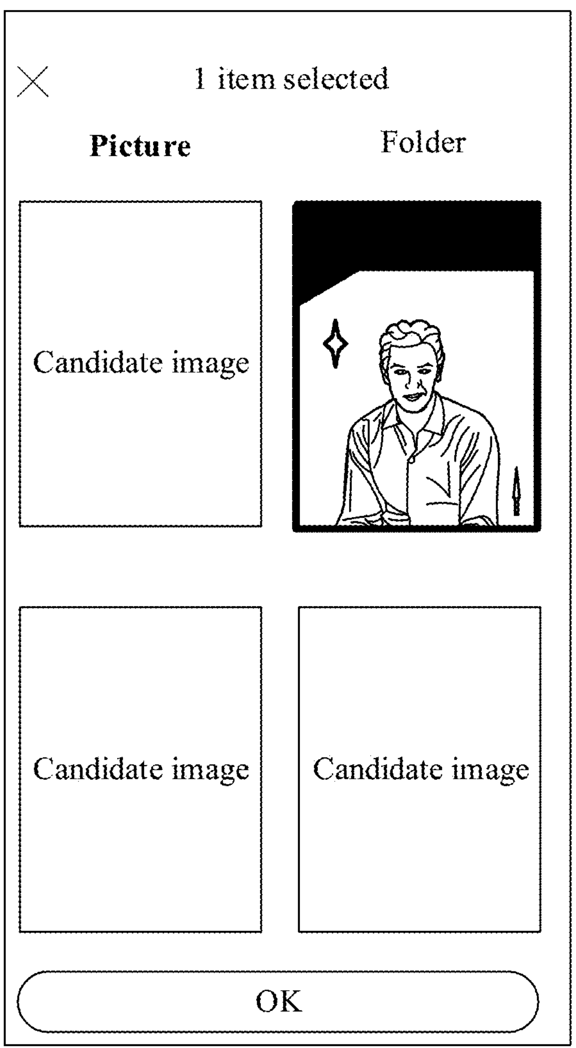
Figure 2C:
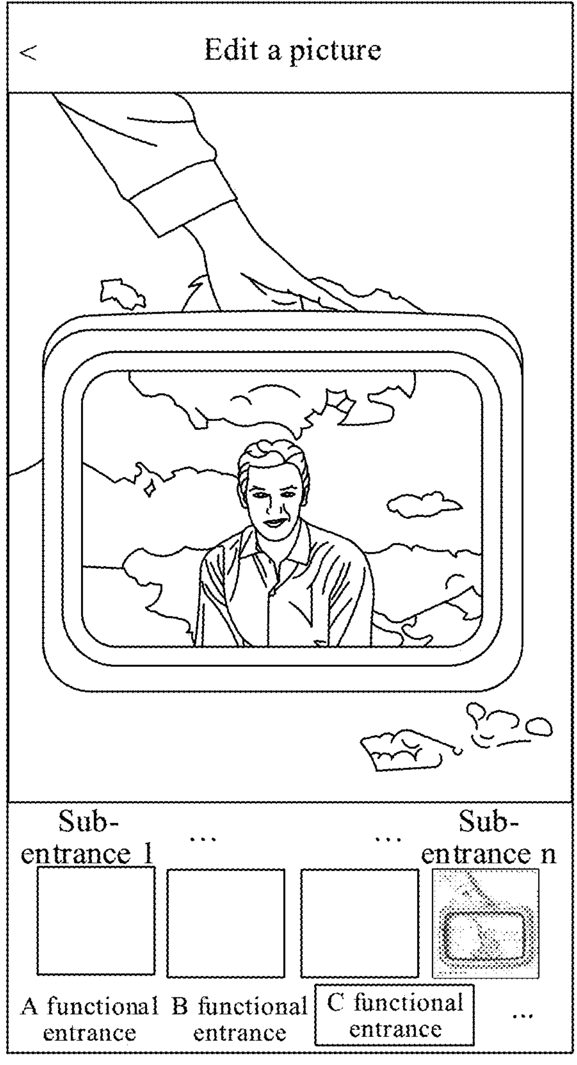

In one embodiment, with reference to diagrams of terminal interface changes shown in FIG. 2A to FIG. 2C, the user synthesizes a target image using a terminal (such as terminal 102 shown in FIG. 1). In this embodiment, a predetermined type of image content is "a figure type of figure image content", and the target image content to be processed is "figure image content to be processed". It will be appreciated that the predetermined types in other scenes may be animal types, vehicle types, and the like.

In this embodiment, referring to FIG. 2A, the terminal displays an "image synthesis interface". Specifically, the user may open, for example, an "image synthesis interface" corresponding to "entrance 2-sub-entrance i-C functional entrance" of FIG. 2A in an application, and the "image synthesis interface" presents at least one pre-set image template. The user may select the pre-set image template in the "image synthesis interface" by a synthesis trigger operation, such as a click or a long press, and then the terminal acquires the pre-set image template selected by the user in response to the selection operation.

For example, the pre-set image template selected by the user In this embodiment is a template of the user CCC selected in a frame in FIG. 2A, and the image pre-synthesis area may be a predetermined area 201 including a figure area in the template of the user CCC in FIG. 2A. The predetermined area may be used for synthesizing the figure type of figure image content, and the template image content may be content in an area apart from a predetermined area. For example, the template image content may be content in an area apart from the predetermined area 201 in the template of the user CCC. It will be easily appreciated that the image pre-synthesis area refers to an area in the pre-set image template, and the template image content refers to image content in an area apart from the image pre-synthesis area of the pre-set image template.

Then, the terminal may present a synthesized target image in response to a synthesis operation in the image synthesis interface. The target image is generated by performing, by a background of the terminal, content compensation and synthesis processing on an image to be synthesized in the image pre-synthesis area, the image to be processed is generated by performing synthesis pre-processing on "figure image content to be processed" in a target image file, the image to be processed only has the "figure image content to be processed", and the "figure image content to be processed" satisfies a requirement of synthesizing "a figure type of figure image content". The terminal may present the synthesized target image in the target interface. The synthesis pre-processing refers to a pre-processing step of image synthesis. By the step, the image to be synthesized only having the target image content to be processed may be generated. The content compensation and synthesis processing include content compensation processing and synthesis processing. The content compensation processing refers to supplementing and modifying image content. Supplementing refers to supplementing a missing part of the image content by a known part of the image content. The modifying refers to modifying content, such as a size, brightness, and a pixel color of an image. The synthesis process refers to fusing a pre-set image template and an image to be synthesized.

In conjunction with FIG. 2B, in one embodiment, the presenting a synthesized target image in response to a synthesis operation in the image synthesis interface may include: displaying an image file selection interface in response to a synthesis trigger operation for the pre-set image template in the image synthesis interface, the displaying an image file selection interface displaying the target image file; and presenting the synthesized target image in response to the synthesis trigger operation for the target image file in the image file selection interface.

Specifically, In this embodiment, for example, a synthesis trigger operation for the pre-set image template of the user is an operation of "do the same style" clicked by the user under the template of the user CCC (namely, the selected pre-set image template) as shown in FIG. 2A. After a terminal application detects the synthesis trigger operation for the pre-set image template, a jump to the image file selection interface as shown in FIG. 2B may be triggered, and then the terminal "displays the image file selection interface". The image file selection interface may present a "target image file" in a particular position (e.g., an album or folder) or a "target image file" shot by the ways of real-time shooting and the like. Since the target image may be automatically generated only by triggering the synthesis trigger operation, the generation efficiency of the target image is improved.

In one embodiment, the presenting the synthesized target image in response to the synthesis trigger operation for the target image file in the image file selection interface may include: highlighting the target image file in response to a selection operation for a candidate image in the image file selection interface, the target image file being a candidate image selected by the selection operation; and presenting the synthesized target image in response to the synthesis trigger operation in the image file selection interface.

At least one candidate image may be presented in the image file selection interface. In the image file selection interface, the user may select the candidate image by a selection operation, such as clicking the candidate image, according to requirements. Furthermore, the terminal determines the candidate image selected by the selection operation as a target image file to be processed, and the target image file may be highlighted in the image file selection interface by darkening the brightness of the target image file or selecting the target image file in a frame, and the like.

The user may trigger the synthesis trigger operation for the target image file in the image file selection interface. For example, the synthesis trigger operation for the target image file is a trigger operation of "OK" clicked by the user in the image file selection interface as shown in FIG. 2B. It is understood that the synthesis trigger operation may be set according to the requirements. After detecting the synthesis trigger operation for the target image file in the terminal, the target image may be synthesized in the background and presented in the target interface.

When the terminal synthesizes the target image in the background, the terminal may specifically: determine whether the target image file includes figure image content to be processed satisfying a requirement of synthesizing a figure type of figure image content; perform synthesis pre-processing on the figure image content to be processed in the target image file to generate an image to be synthesized only having the figure image content to be processed in response to that the target image file includes the figure image content to be processed; and fuse the image to be synthesized to an image pre-synthesis area to generate a target image fusing template image content and the figure image content to be synthesized.

The target image synthesized in the terminal may be stored in a predetermined position, and the target image is presented on a target page. In this embodiment, the target image is displayed in an "editing" interface as shown in FIG. 2C, and the user may further edit the target image on the "editing" interface.

By displaying the image synthesis interface, a pre-set image template including the image pre-synthesis area and the template image content may be displayed by the image synthesis interface. By displaying the image synthesis interface, the synthesized target image may be presented in response to the synthesis operation triggered at the image synthesis interface. The synthesized target image is generated by fusing the image to be synthesized to the image pre-synthesis area. The image to be synthesized only includes the target image content to be processed, but does not include the remaining image content affecting the image synthesis. Therefore, the image to be synthesized is synthesized in the image pre-synthesis area, and the template image content in the pre-set image template and the target image content to be processed may be adaptively fused as a whole to generate an integrated target image. The two are independent from each other and not fused caused by simply adding mask processing, and Accordingly, the effects may be avoided. Furthermore, the integrated fusion can be achieved accurately and effectively, and the image processing effect can be effectively improved.

Figure 3:
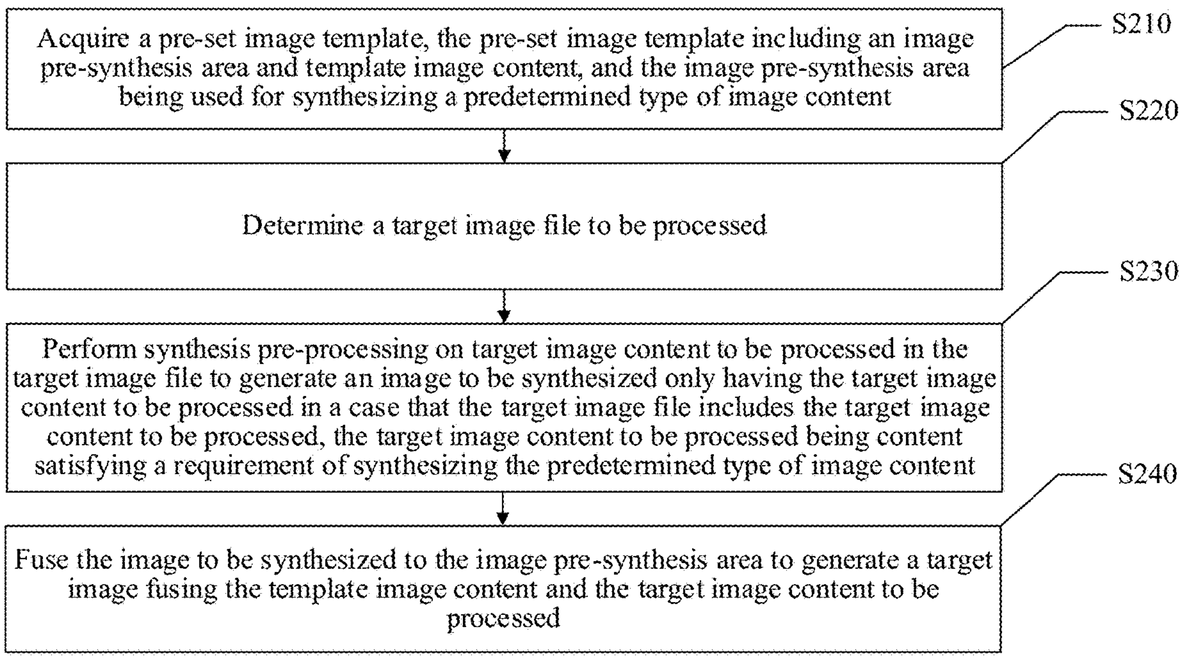
FIG. 3 shows a flowchart of an image processing method according to an embodiment of this application.

FIG. 3 shows a flowchart of an image processing method according to an embodiment of this application. The execution entity of the image processing method may be any terminal, such as terminal 102 shown in FIG. 1.

As shown in FIG. 3, the image processing method may include step S210 to step S250.

Step S210: Acquire a pre-set image template, the pre-set image template including an image pre-synthesis area and template image content, and the image pre-synthesis area being used for synthesizing a predetermined type of image content.

Step S220: Determine a target image file to be processed.

Step S230: Perform synthesis pre-processing on target image content to be processed in the target image file to generate an image to be synthesized only having the target image content to be processed in response to that the target image file includes the target image content to be processed, the target image content to be processed being content satisfying a requirement of synthesizing the predetermined type of image content.

Step S240: Fuse the image to be synthesized to the image pre-synthesis area to generate a target image fusing the template image content and the target image content to be processed.

The pre-set image template is a pre-set image template for synthesizing other images. The pre-set image template includes the image pre-synthesis area, and a contour shape of the image pre-synthesis area may be laid out according to requirements. The image pre-synthesis area may be used for synthesizing the predetermined type of image content, such as image content of a predetermined creature or a predetermined object. The pre-set image template may be acquired from a predetermined position. For example, a certain pre-set image template may be selected from an image processing application.

In one example, with reference to FIG. 2A, the user may open, for example, an "image synthesis interface" corresponding to "entrance 2-sub-entrance i-C functional entrance" of FIG. 2A in an application, and the "image synthesis interface" presents at least one pre-set image template. The user may select the pre-set image template in the "image synthesis interface" by a synthesis trigger operation, such as a click or a long press, and then the terminal acquires the pre-set image template selected by the user in response to the selection operation. For example, the pre-set image template selected by the user is a template of the user CCC selected in a frame in FIG. 2A, and the image pre-synthesis area may be a predetermined area including a figure area in the template of the user CCC in FIG. 2A. The predetermined area may be used for synthesizing the figure type of figure image content, and the template image content may be content in an area apart from a predetermined area.

The target image file to be processed, i.e., an image requiring secondary processing, may be determined from a particular position, e.g., a certain picture selected by the user from an album of the terminal.

In one example, the user may trigger enabling the image file selection interface as shown in FIG. 2B in the terminal. The image file selection interface may present a "target image file" in a particular position (e.g., an album or folder) or a "target image file" shot by the ways of real-time shooting and the like. The user may trigger the synthesis trigger operation for the target image file in the image file selection interface. For example, the user clicks "OK" in the image file selection interface as shown in FIG. 2B to trigger the synthesis trigger operation. After detecting the synthesis trigger operation for the target image file in the terminal, the target image may be synthesized in the background.

When synthesizing the target image, the terminal first determines whether the target image file includes target image content to be processed satisfying a requirement of synthesizing a predetermined type of image content. For example, it determines whether the target image file includes the target image content to be processed satisfying the image content of a predetermined creature or a predetermined object.

Synthesis pre-processing is performed on target image content to be processed in the target image file to generate an image to be synthesized that includes only the target image content to be processed in response to that the target image file includes the target image content to be processed. The image to be synthesized only has the target image content to be processed and does not have other content apart from the target image content to be processed.

Furthermore, the image to be synthesized is fused to the image pre-synthesis area. For example, content compensation and synthesis processing are performed on the image to be synthesized in the image pre-synthesis area, so that adaptive synthesis processing can be effectively performed on content of two images to generate the target image fusing the template image content and the target image content to be processed.

Accordingly, based on step S210 to step S240, the pre-synthesis area for synthesizing the predetermined type of image content is set in the pre-set image template. During the image processing, it is first determined whether the target image file includes the target image content to be processed satisfying the requirement of synthesizing the predetermined type of image content. If the target image file includes the target image content to be processed, further processing is performed to avoid blind synthesis between the template and the content in the target image file to be processed and improve the synthesis accuracy. Further, during the synthesis processing, synthesis pre-processing is performed on the target image file to generate the image to be synthesized only having a predetermined type of target image content to be processed. Furthermore, the image to be synthesized only includes the target image content to be processed, but does not include the remaining image content affecting the image synthesis. Therefore, the image to be synthesized is synthesized in the image pre-synthesis area, and the template image content in the pre-set image template and the target image content to be processed may be adaptively fused as a whole to generate an integrated target image. The two are independent from each other and not fused caused by simply adding mask processing, and Accordingly, the effects may be avoided. Further, in this application, the integrated fusion of a target image file to be processed and the content in a pre-set image template can be achieved accurately and effectively, and the image processing effect can be effectively improved.

Figure 4:
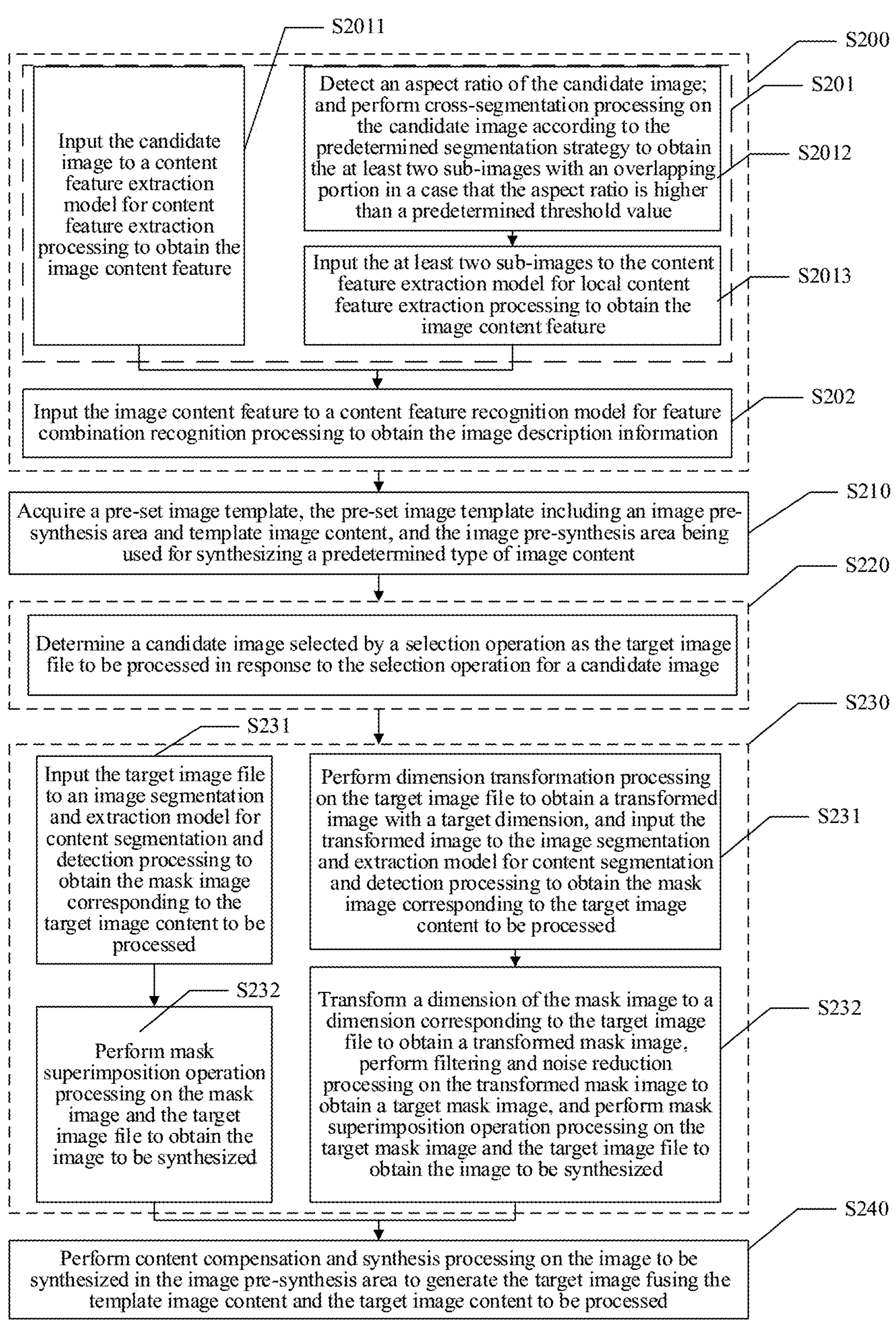
FIG. 4 shows a flowchart of an image processing method according to another embodiment of this application.

With reference to FIG. 4, a particular process of each step performed when performing image processing will be described below.

In step S210, a pre-set image template is acquired, the pre-set image template includes an image pre-synthesis area and template image content, and the image pre-synthesis area is used for synthesizing a predetermined type of image content.

The pre-set image template may be acquired from a predetermined position. For example, a certain pre-set image template may be selected from an image processing application, and the selected pre-set image template may be acquired locally from a cloud or a terminal.

The pre-set image template may include at least one, and each pre-set image template may include at least one image pre-synthesis area and template image content. The shape, size, and the like of at least one image pre-synthesis area included in each pre-set image template may be the same or different, and the template image content is the content of the area apart from the image pre-synthesis area.

In step S220, a target image file to be processed is determined.

The target image file to be processed may be periodically acquired from a particular position (e.g., an album or folder), acquired in real time based on the user's operation, or autonomously acquired by the terminal. In some ways, the target image file to be processed may be a picture stored in a certain folder designated by the user. In some ways, the target image file to be processed may be a certain picture of a candidate image selected by the user in real time from an album of the terminal according to requirements.

Before step S230, the above image processing method further includes determining whether the target image file includes the target image content to be processed satisfying the requirement of synthesizing the predetermined type of image content.

In one embodiment, the computer device may determine whether the target image file includes the target image content to be processed satisfying the requirement of synthesizing the predetermined type of image content based on the pre-set image description information. For example, when the predetermined type is a face type, and the image description information includes "the image is an image shot with respect to a face", the computer device determines that the target image file includes the target image content to be processed satisfying the requirement of synthesizing the predetermined type of image content. In one embodiment, the computer device may perform real-time content detection on the target image file to determine whether the target image file includes the target image content to be processed satisfying the requirement of synthesizing the predetermined type of image content. For example, when the predetermined type is a face type, the computer device may detect the target image file by a pre-trained machine learning model to determine whether there is a face in the target image file. If there is a face, it is determined that the target image file includes the target image content to be processed satisfying the requirement of synthesizing the predetermined type of image content.

In one embodiment, the determining a target image file to be processed in step S220 includes: determining a candidate image selected by a selection operation as the target image file to be processed in response to the selection operation for a candidate image. Before step S230, the image processing method further includes a step of determining target image content to be processed, including determining whether the target image file includes the target image content to be processed satisfying a requirement of synthesizing the predetermined type of image content.

In one embodiment, the determining whether the target image file includes the target image content to be processed satisfying a requirement of synthesizing the predetermined type of image content includes: acquiring image description information corresponding to the target image file; and determining whether the target image file includes the target image content to be processed satisfying the requirement of synthesizing the predetermined type of image content based on the image description information.

The candidate image is one of the images available for selection, for example an image in a local album of the terminal. The user may select one or at least two candidate images from the candidate images by a selection operation, such as clicking, and the terminal determines the candidate image selected by the selection operation as the target image file to be processed.

Further, in response to the selection operation, the terminal may acquire the image description information corresponding to the selected target image file from an information storage position in the database, and the image description information is pre-set. It can efficiently and accurately determine whether the target image file includes the target image content to be processed satisfying the requirement of synthesizing the predetermined type of image content based on the image description information without content detection. If the image description information indicates that the candidate image includes the target image content to be processed satisfying the requirement of synthesizing the predetermined type of image content, successful synthesis of the target image file and the template can be ensured. For example, when the image description information about the target image file is "there is the target image content to be processed", it may be determined that the target image file includes the target image content to be processed satisfying the requirement of synthesizing the predetermined type of image content.

In one embodiment, when the target image file does not have the image description information, the computer device may detect the target image file by the machine learning model to determine whether the target image file includes the target image content to be processed satisfying the requirement of synthesizing the predetermined type of image content, generate the image description information according to a determination result, and store the image description information corresponding to the target image file. As such, when it subsequently needs to determine whether the target image file includes the image content to be processed again, the image description information may be directly obtained without the need to detect by the machine learning model.

In the above embodiments, whether the target image includes the target image content to be processed can be determined directly by the image description information, and the efficiency of determining the target image content to be processed can be improved.

In one embodiment, a candidate image set includes a target image file to be processed. Before the target image file to be processed is determined in step S220, there is further included step S200: Extract an image content feature from a candidate image for each candidate image in the candidate image set; and perform feature combination recognition processing based on the image content feature to obtain image description information corresponding to the candidate image, the image description information being used for indicating whether the image file includes the target image content to be processed satisfying the requirement of synthesizing the predetermined type of image content.

Specifically, the candidate image set includes at least one candidate image. For each candidate image in the candidate image set, respective image description information may be generated. For example, for a current candidate image in the candidate image set, the computer device may extract the image content feature from the current candidate image, and perform feature combination recognition processing on the extracted image content feature to obtain image description information about the current candidate image. The feature combination recognition processing refers to a process of comprehensively extracting a plurality of image content features characterizing local content to determine a recognition result.

For the candidate image, the image content feature is extracted to perform combination recognition processing, and the image description information can be accurately obtained. The image description information is used for indicating that the candidate image includes the predetermined type of target image content. Furthermore, whether the candidate image includes the target image content is acquired in advance. When the target image file to be processed is selected from the candidate image, whether the selected image includes the target image content can be accurately and efficiently determined.

Figure 5:
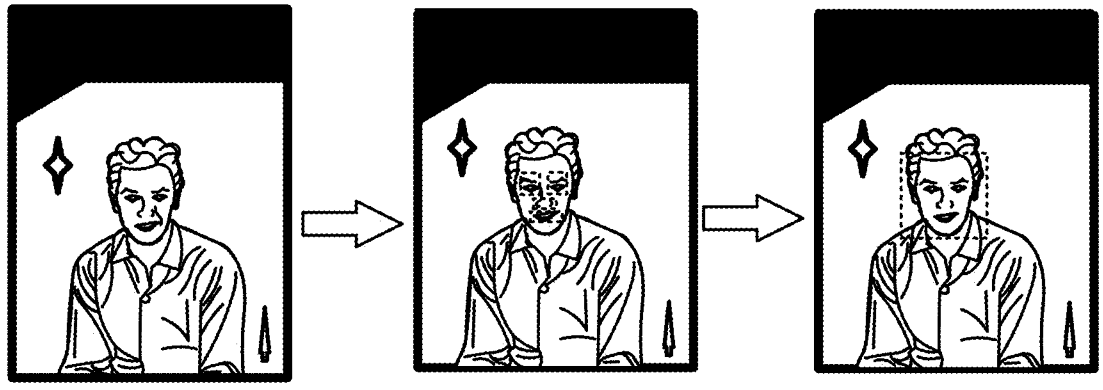
FIG. 5 shows a flowchart of feature recognition according to an embodiment of this application.

In an example, with reference to FIG. 5, the predetermined type of image content is the figure image content corresponding to the figure type. The image content features are the features, such as the left eye, the right eye, the nose, the left half of the mouth, and the right half of the mouth, selected in frames in the middle image of FIG. 5. By combination recognition of these image content features, it can be accurately determined that these features belong to the face image selected in a frame in the right image of FIG. 5. Furthermore, the image description information for indicating whether the image file includes the target image content to be processed can be accurately generated.

In one embodiment, the extracting an image content feature from a candidate image in step S200 includes step S201: Input the candidate image to a content feature extraction model for content feature extraction processing to obtain the image content feature; and the performing feature combination recognition processing based on the image content feature to obtain image description information corresponding to the candidate image in step S200 includes step S202: Input the image content feature to a content feature recognition model for feature combination recognition processing to obtain the image description information.

The content feature extraction model, i.e., a feature extraction model based on deep learning, may be configured to extract the image content feature from the image. In one embodiment, the content feature extraction model is an intelligent model (referred to as a mobile neural network (MNN) feature extraction model for short) configured for feature extraction obtained by the MNN (a lightweight deep neural network inference engine) through the training of deep learning of the image feature, and can effectively extract the image content feature at an end side.

The content feature recognition model, i.e., a feature recognition model based on deep learning, may be used for recognizing what type of image content an image content feature belongs to. In one embodiment of the embodiment, the content feature recognition model is an intelligent model (referred to as a MNN feature recognition model for short) configured for feature alignment and recognition obtained by the MNN (a lightweight deep neural network inference engine) through the training of deep learning of the image feature, and can effectively recognize the image content feature at the end side.

In the embodiment, by the content feature extraction model and the content feature recognition model, a dual scheme of feature extraction and recognition is realized to ensure the accuracy of the extracted image description information.

It will be appreciated that in one embodiment, the content feature extraction processing in step S201 and the image content feature recognition processing in step S202 may be performed based on a content recognition model. For example, the content recognition model is an intelligent model for feature extraction and recognition obtained by the MNN (a lightweight deep neural network inference engine) through the training of deep learning of the portrait feature.

In one embodiment, the inputting the candidate image to a content feature extraction model for content feature extraction processing to obtain the image content feature in step S201 includes step S2011: Input the candidate image to a content feature extraction model for content feature extraction processing to obtain the image content feature. In the embodiment, the candidate images are directly inputted to the feature content feature extraction model to extract the image content feature.

In one embodiment, the inputting the candidate image to a content feature extraction model for content feature extraction processing to obtain the image content feature in step S201 includes step S2012: Perform cross-segmentation processing on the candidate image according to a predetermined segmentation strategy to obtain at least two sub-images with an overlapping portion; and step S2013: Input the at least two sub-images to the content feature extraction model for local content feature extraction processing to obtain the image content feature.

The predetermined segmentation strategy may be a strategy indicating the dimension, the number, and the overlapping area size of the segmented sub-images. The computer device performs cross-segmentation processing on the candidate image according to the predetermined segmentation strategy, and cross segment the candidate image into at least two sub-images with an overlapping portion based on strategy information about the dimension, the number, and the overlapping area size of the segmented sub-images.

Local content feature extraction processing is performed based on at least two sub-images with an overlapping portion, and content feature extraction may be performed from the local candidate image corresponding to each sub-image, to avoid failing to extract the feature when there are defects in the candidate image. In addition, there is an overlapping portion between the sub-images to avoid a recognition error caused by feature segmentation.

Figure 6:
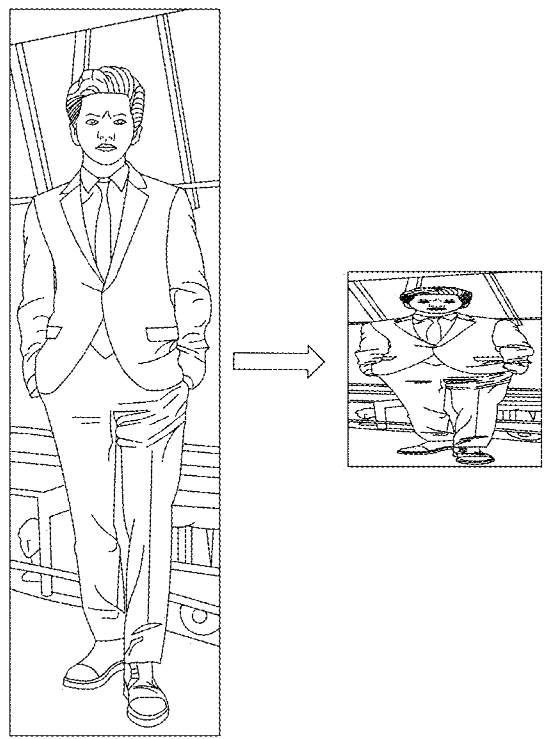
FIG. 6 shows a flowchart of image compression processing according to an embodiment of this application.

With reference to FIG. 6, for example, the content feature extraction model is an intelligent model (referred to as a MNN feature extraction model for short) configured for feature extraction obtained by the MNN (a lightweight deep neural network inference engine) through the training of deep learning of the portrait feature. When the candidate image on the left side in FIG. 6 is directly inputted to the MNN feature extraction model, it needs to be compressed into a 320*320 square graph. The features of the compressed image, such as the left eye, the right eye and the nose have the defect of compression deformation, and the features cannot be extracted when the model is recognized.

Figure 7:
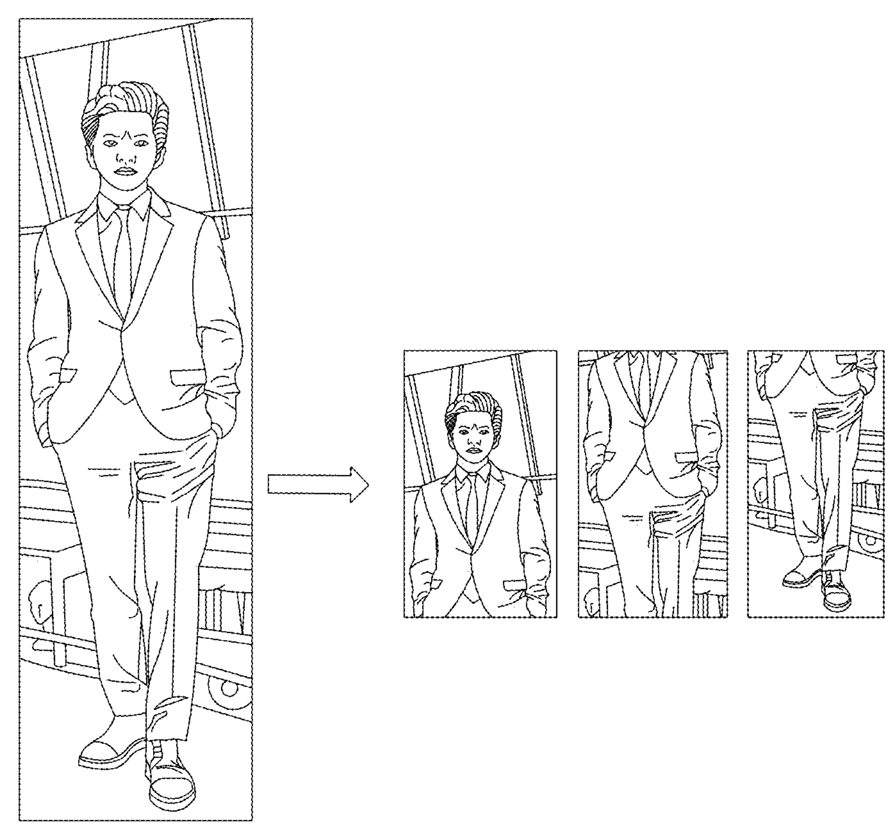
FIG. 7 shows a flowchart of image segmentation according to an embodiment of this application.

Further, with reference to FIG. 7, the computer device performs cross-segmentation processing on the candidate image on the left side in FIG. 6 to obtain 3 sub-images with overlapping portions shown on the right side in FIG. 7, and the aspect ratio of the sub-images is 4:3. When the sub-images are inputted to the MNN feature extraction model, the features can still be accurately extracted after the sub-images are compressed into a 320*320 square graph. In one embodiment, the performing cross-segmentation processing on the candidate image according to a predetermined segmentation strategy to obtain at least two sub-images with an overlapping portion in step S2012 includes: detecting an aspect ratio of the candidate image; and performing cross-segmentation processing on the candidate image according to the predetermined segmentation strategy to obtain the at least two sub-images with an overlapping portion in response to that the aspect ratio is higher than a predetermined threshold value.

By detecting the aspect ratio of the candidate image, if the aspect ratio is higher than the predetermined threshold value, the computer device performs cross-segmentation processing on the candidate image according to the predetermined segmentation strategy. For example, cross-segmentation processing is performed only when the aspect ratio of the candidate image on the left side of FIG. 6 is detected to be higher than the predetermined threshold value, therefore avoiding useless segmentation operations and improving the image processing efficiency. If the aspect ratio of the candidate image is less than the predetermined threshold value, cross-segmentation processing is stopped to perform, and content feature extraction processing is directly performed on the candidate image to obtain the image content feature.

Cross-segmentation processing is performed only when the aspect ratio of the candidate image is detected to be higher than the predetermined threshold value, therefore avoiding useless segmentation operations and improving the image processing efficiency.

In step S230, synthesis pre-processing is performed on target image content to be processed in the target image file to generate an image to be synthesized only having the target image content to be processed in response to that the target image file includes the target image content to be processed.

In one embodiment, the image content feature includes a local feature corresponding to each of the at least two sub-images. The inputting the at least two sub-images to the content feature extraction model for local content feature extraction processing to obtain the image content feature includes: recognizing a feature area in the sub-image by the content feature extraction model for each of at least two sub-images and extracting a feature in the feature area to obtain a local feature corresponding to the sub-image. The feature area includes at least one of a left eye area, a right eye area, a nose area, a left half of mouth area, or a right half of mouth area. The inputting the image content feature to a content feature recognition model for feature combination recognition processing to obtain the image description information includes inputting the local feature corresponding to each of the at least two sub-images to the content feature recognition model to generate the image description information by integrating respective local features through the content feature recognition model.

For each of at least two sub-images, the computer device extracts the feature in the feature area of the sub-image by the content feature extraction model to obtain the local feature corresponding to each of the at least two sub-images. The local features corresponding to respective sub-images are integrated to obtain the image content feature. Further, the computer device triggers the content feature recognition model to recognize the integrated local features corresponding to the respective sub-images and obtain a recognition result, and generates the image description information based on the recognition result. For example, when the local features corresponding to the sub-image are a left-eye feature, a right-eye feature, a nose feature, or the like, the result outputted by the content feature recognition model may be that the candidate image includes a face, and the image description information generated based on the result may be that "the present image includes a face and belongs to a portrait image".

Since the local features corresponding to the respective sub-images are integrated for recognition, the recognition result can be more accurate.

In one embodiment, the performing synthesis pre-processing on target image content to be processed in the target image file to generate an image to be synthesized only having the target image content to be processed in step S230 includes step S231: Detect the target image content to be processed in the target image file to obtain contour information about the target image content to be processed; and step S232: Extract the target image content to be processed from the target image file based on the contour information to obtain the image to be synthesized only having the target image content to be processed.

The contour information refers to information describing the contour of the target image content to be processed. For example, the target image content to be processed is a figure image of a target figure, the contour information is information that can describe the contour of the figure image, and the computer device may extract the figure image from the target image file to be processed based on the detected contour information to generate the image to be synthesized only having the figure image. Since the contour information is information describing the contour of the target image content to be processed, the target image content to be processed may be accurately extracted from a target image text to be processed by the contour information.

In one embodiment, the contour information is a mask image. the detecting the target image content to be processed in the target image file to obtain contour information about the target image content to be processed in step S231 includes: inputting the target image file to an image segmentation and extraction model for content segmentation and detection processing to obtain the mask image corresponding to the target image content to be processed, the mask image being an image for indicating a contour of the target image content to be processed.

The image segmentation and extraction model, namely, an image segmentation model based on deep learning, and the computer device may be configured to segment the image to generate the mask image. In one embodiment, the image segmentation and extraction model is an intelligent model (referred to as a MNN segmentation and extraction model for short) configured to segment the image and generate a mask image obtained by the MNN (a lightweight deep neural network inference engine) through the training of deep learning of the image feature, and can effectively segment the image and generate the mask image at the end side.

Figure 8:
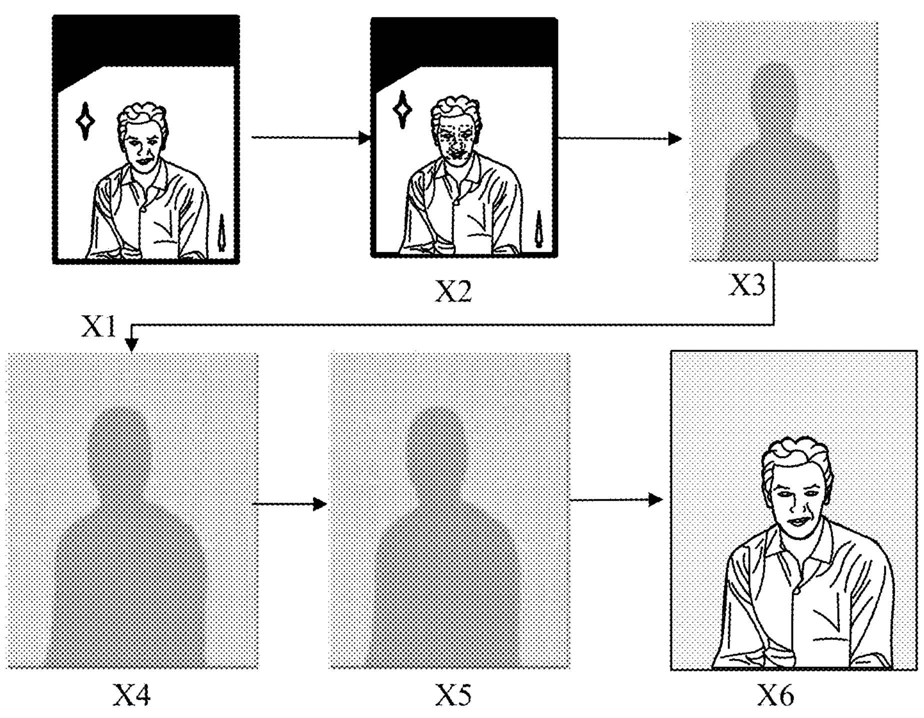
FIG. 8 shows a flowchart of image extraction according to an embodiment of this application.

The computer device inputs the target image file to be processed to an image segmentation and extraction model, and the image segmentation model may detect and segment the target image content to be processed to generate the mask image corresponding to the target image content to be processed. The mask image is image X3 as shown in FIG. 8, a content area corresponding to the target image content to be processed is a non-zero pixel, and an area outside the content area is a zero pixel.

The mask image may be used for indicating the contour of the target image content to be processed; and therefore, by generating the mask image, the target image content to be processed may be accurately extracted from the target image file based on the mask image.

In one embodiment, the extracting the target image content to be processed from the target image file based on the contour information to obtain the image to be synthesized only having the target image content to be processed in step S232 includes: performing mask superimposition operation processing on the mask image and the target image file to obtain the image to be synthesized, the image to be synthesized including a content area corresponding to the target image content to be processed, and an outside of the content area in the image to be synthesized being a transparent area.

A pixel of the content area corresponding to the target image content to be processed in the mask image is a non-zero pixel, and an area outside the content area is a zero pixel. Mask superimposition operation processing is performed on the mask image and the target image file to be processed to obtain the image to be synthesized. The image to be synthesized includes the content area corresponding to the target image content, and the outside of the content area in the image to be synthesized is the transparent area. When the image to be synthesized is synthesized to a pre-set image template, the image to be synthesized is then only fused to the target image content.

In one embodiment, the mask superimposition operation processing refers to a method of placing the mask image on the target image file to be processed and extracting the target image content to be processed based on overlapping pixel points in the mask image and the target image file.

The image to be synthesized only including the target image content to be processed may be obtained only by performing mask superimposition operation processing on the mask image and the target image file, therefore improving the generation efficiency of the image to be synthesized.

In one embodiment, the inputting the target image file to an image segmentation and extraction model for content segmentation and detection processing to obtain the mask image corresponding to the target image content to be processed includes: performing dimension transformation processing on the target image file to obtain a transformed image with a target dimension, and inputting the transformed image to the image segmentation and extraction model for content segmentation and detection processing to obtain the mask image corresponding to the target image content to be processed; and the performing mask superimposition operation processing on the mask image and the target image file to obtain the image to be synthesized includes: transforming a dimension of the mask image to a dimension corresponding to the target image file to obtain a transformed mask image, performing filtering and noise reduction processing on the transformed mask image to obtain a target mask image, and performing mask superimposition operation processing on the target mask image and the target image file to obtain the image to be synthesized.

According to the adaptation requirements of the image segmentation and extraction model, the computer device performs dimension transformation processing on the target image file to be processed to obtain the transformed image with the target size, and then detects the transformed image using the image segmentation and extraction model, so that the mask image corresponding to the target image content may be accurately obtained.

In one embodiment, the performing mask superimposition operation processing on the target mask image and the target image file to obtain the image to be synthesized includes: placing the mask image on the target image file and determining a target pixel in the target image file overlapping with a non-zero pixel in the mask image; and extracting the target pixel to generate an image to be synthesized.

The computer device adjusts the dimension of the target image file such that the dimension of the target image file is consistent with the dimension of the mask image. Further, the computer device places the mask image on the target image file and determines the target pixel in the target image file overlapping with the non-zero pixel in the mask image. The computer device extracts the target pixel and combines the respective target pixels based on the positions of the target pixels in the target image file to obtain the image to be synthesized.

For example, with reference to FIG. 8, the computer device compresses the target image file X1 to the transformed image X2 of 320*320 by dimension transformation processing, and inputs the MNN segmentation and extraction model for detection. The MNN segmentation and extraction model may detect and segment the figure image content from the transformed image X2 to generate the mask image X3.

The computer device transforms the dimension of the mask image to the dimension corresponding to the target image file to obtain the transformed mask image, for example, transforming the mask image X3 in FIG. 8 to the original image size, namely, the dimension corresponding to the target image file to be processed, to obtain the transformed mask image X4.

The computer device performs filtering and noise reduction processing on the transformed mask image to obtain the target mask image, for example, performing filtering and noise reduction processing on the transformed mask image X4 in FIG. 8 (for example, 5 order median filtering and noise reduction may be used) to obtain the target mask image X5. The computer device performs mask superimposition operation processing on the target mask image and the target image file to be processed to obtain the image to be synthesized, for example, performing mask superimposition operation processing on the target mask image X5 and the target image file X1 to be processed in FIG. 8 to obtain the image to be synthesized X6.

By enlarging the mask image to the original image size, some jaggies will be produced at the edge. By performing filtering and noise reduction processing on the transformed mask image, the edge may be smoothed. Then, the edge of the target image content in the image to be synthesized is smoothed, so that the image synthesis effect can be ensured.

The fusing the image to be synthesized to the image pre-synthesis area to generate a target image fusing the template image content and the target image content to be processed in step S240 includes performing content compensation and synthesis processing on the image to be synthesized in the image pre-synthesis area to generate the target image fusing the template image content and the target image content to be processed, the content compensation and synthesis processing including content compensation processing and synthesis processing, the content compensation processing referring to supplementing and modifying image content, and the synthesis processing referring to a synthesis process of synthesizing at least two images into one image.

The image synthesis strategy (including a pre-set content synthesis strategy and a personalized image synthesis strategy) may include adjustment and compensation strategy information, such as the size, the brightness, the pixel color and the like of the image to be synthesized and/or the template image content, and strategy information, such as the placement position of the image to be synthesized or the alignment mode of the compensated image to be synthesized and template image content. The computer device determines an image synthesis strategy matched with the pre-set image template. After determining the matched image synthesis strategy, content compensation and synthesis processing may be performed on the image to be synthesized in the image pre-synthesis area according to the image synthesis strategy to generate a target image that effectively achieves integrated fusion of the template image content and the target image content to be processed. An image synthesis strategy corresponding to each image template may be pre-set to obtain a corresponding relationship between the image template and the image synthesis strategy, so that after determining the pre-set image template, the computer device may directly determine the matched image synthesis strategy based on the corresponding relationship.

Figure 9:
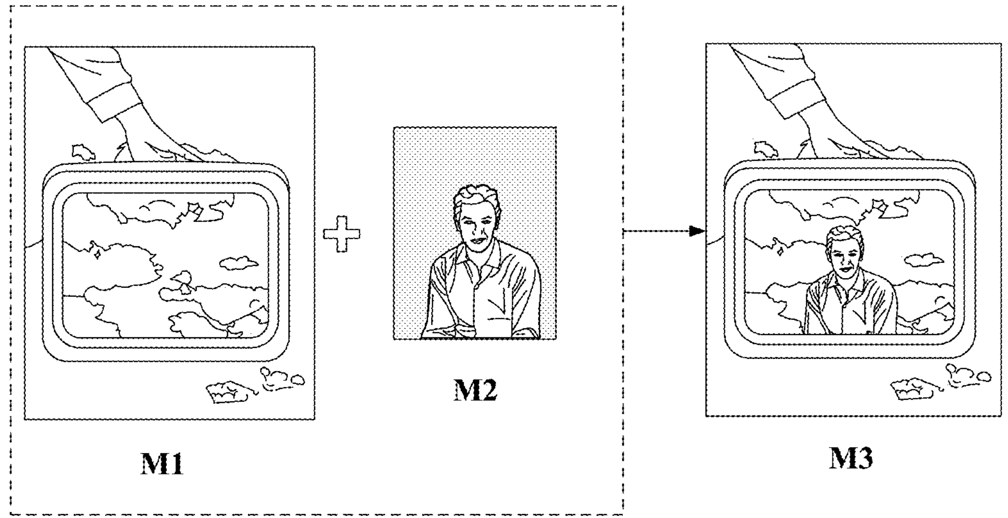
FIG. 9 shows a schematic diagram of image synthesis according to an embodiment of this application.

With reference to FIG. 9, the computer device may perform content compensation and synthesis processing by a tool, such as a brush and a drawing board, and draw a figure image in the image to be synthesized M2 in the image pre-synthesis area of the pre-set image template Ml to obtain the fused target image M3. In one embodiment, the content compensation and synthesis processing may specifically be a processing process of drawing the target image content to be processed (non-transparent image content) in the image to be synthesized M2 in the image pre-synthesis area of the pre-set image template M2 by the tool, such as a brush and a drawing board, to obtain the target image M3.

Since the image to be processed only includes the target image content to be processed and does not include the remaining content, drawing the target image content to be processed in the image to be synthesized in the image pre-synthesis area may obtain an integrated target image.

In one embodiment, the fusing the image to be synthesized to the image pre-synthesis area in step S240 includes performing content compensation and synthesis processing on the image to be synthesized in the image pre-synthesis area. The performing content compensation and synthesis processing on the image to be synthesized in the image pre-synthesis area includes: acquiring a pre-set content synthesis strategy corresponding to the pre-set image template; performing content compensation processing on the image to be synthesized and the template image content according to content compensation information in the pre-set content synthesis strategy to obtain the compensated image to be synthesized and the compensated template image content; and fusing the compensated image to be synthesized to the image pre-synthesis area to perform image synthesis on the compensated image to be synthesized and the compensated template image content.

In this embodiment, the computer device acquires the pre-set content synthesis strategy corresponding to the pre-set image template as an image synthesis strategy, and performs content compensation processing on content, such as a size, brightness, and a pixel color of the image to be synthesized and the template image content according to adjustment compensation strategy information about the size, the brightness, the pixel color, and the like of the image to be synthesized and/or the template image content in the pre-set content synthesis strategy. Then, in the image pre-synthesis area, according to strategy information, such as the placement position of the image to be synthesized or the alignment mode of the compensated image to be synthesized and template image content in the pre-set content synthesis strategy, image synthesis is performed on the compensated image to be synthesized and template image content, and image synthesis may be performed efficiently to generate the target image.

By performing content compensation processing on the image to be synthesized and the pre-set template image, a more adaptive image to be synthesized and pre-set template image may be obtained. By obtaining the more adaptive image to be synthesized and pre-set template image, the final generated target image may be integrated, thereby improving the image processing effect.

In one embodiment, the fusing the image to be synthesized to the image pre-synthesis area in step S240 includes performing content compensation and synthesis processing on the image to be synthesized in the image pre-synthesis area. The performing content compensation and synthesis processing on the image to be synthesized in the image pre-synthesis area includes: acquiring image feature information about the image to be synthesized and acquiring pre-set description information about the image pre-synthesis area; analyzing based on the image feature information and the pre-set description information to obtain an image synthesis strategy for matching the pre-set image template and the image to be synthesized; performing content compensation processing on the image to be synthesized and the template image content according to content compensation information in the image synthesis strategy to obtain the compensated image to be synthesized and the compensated template image content; and fusing the compensated image to be synthesized to the image pre-synthesis area to perform image synthesis on the compensated image to be synthesized and the compensated template image content.

In this embodiment, the computer device analyzes based on the image feature information and the pre-set description information to obtain a personalized image synthesis strategy, which may further adaptively fuse the two to generate the target image. The image feature information may be information, such as the size, the color, and the brightness of the target image content extracted from the image to be synthesized. The pre-set description information about the image pre-synthesis area is pre-set information for describing the area, and the pre-set description information may include information, such as the size, the color, and the brightness of the area.

The way of analyzing based on the image feature information and the pre-set description information may include taking a strategy matching the image feature information and the pre-set description information from at least one pre-set strategy as an image synthesis strategy matching the pre-set image template and the image to be synthesized.

The way of analyzing based on the image feature information and the pre-set description information may further include inputting the image feature information and the pre-set description information to a pre-trained strategy analysis model based on deep learning. The model may analyze to output a prediction strategy label, and query a candidate strategy matching the prediction strategy label from at least one candidate strategy as the image synthesis strategy matching the pre-set image template and the image to be synthesized.

The computer device performs content compensation processing on content, such as a size, brightness, and a pixel color of the image to be synthesized and the template image content according to content compensation information about the size, the brightness, the pixel color, and the like of the image to be synthesized and/or the template image content in the image synthesis strategy. Then, in the image pre-synthesis area, according to strategy information, such as the placement position of the image to be synthesized or the alignment mode of the compensated image to be synthesized and template image content in the image synthesis strategy, image synthesis is performed on the compensated image to be synthesized and template image content.

By performing content compensation processing on the image to be synthesized and the pre-set template image, a more adaptive image to be synthesized and pre-set template image may be obtained. By obtaining the more adaptive image to be synthesized and pre-set template image, the final generated target image may be integrated, thereby improving the image processing effect.

Figure 10:
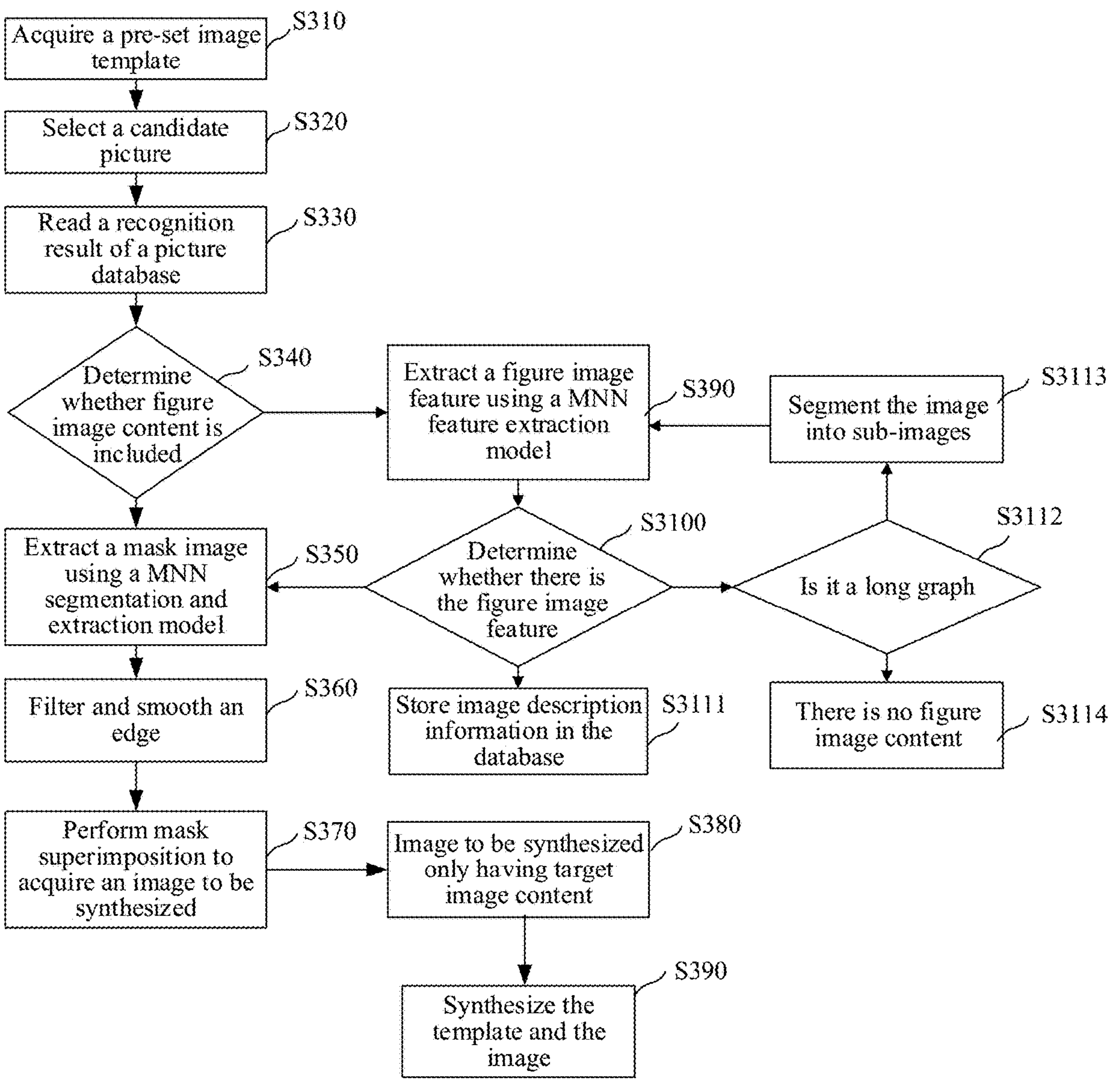
FIG. 10 shows a flowchart of a process of image processing according to one embodiment of this application.

The foregoing embodiments are further described below in connection with a flow of image processing in an application scene. With reference to FIG. 10, an overall flowchart of image processing In this embodiment is shown.

With reference to FIG. 10, the overall flow of image processing In this embodiment may include step S310 to step S311.

Step S310: Acquire a pre-set image template, the pre-set image template including an image pre-synthesis area and template image content, and the image pre-synthesis area being used for synthesizing a predetermined type of image content. A predetermined type of image content In this embodiment is a figure type of figure image content.

Specifically, the terminal may present an image synthesis interface, the image synthesis interface displays a pre-set image template, the pre-set image template includes an image pre-synthesis area and template image content, and the image pre-synthesis area is used for synthesizing a figure type of figure image content.

With reference to FIG. 2A, the user may open, for example, an "image synthesis interface" corresponding to "entrance 2-sub-entrance i-C functional entrance" of FIG. 2A in an application, and the "image synthesis interface" presents at least one pre-set image template. The user may select the pre-set image template in the "image synthesis interface" by a synthesis trigger operation, such as a click or a long press, and then the terminal acquires the pre-set image template selected by the user in response to the selection operation.

In this embodiment, the pre-set image template selected by the user is a template of the user CCC selected in a frame in FIG. 2A, and the image pre-synthesis area may be a predetermined area including a figure area in the template of the user CCC in FIG. 2A. The predetermined area may be used for synthesizing the figure type of figure image content, and the template image content may be content in an area apart from a predetermined area.

Step S320: Select a candidate picture. Namely, determining a target image file to be processed includes determining a candidate image selected by a selection operation as the target image file to be processed in response to the selection operation for a candidate image.

Specifically, in response to a synthesis trigger operation for a pre-set image template in an image synthesis interface, an image file selection interface may be displayed in the terminal. At least one candidate image may be presented in the image file selection interface. In the image file selection interface, the user may select the candidate image by a selection operation, such as clicking the candidate image, according to requirements. Furthermore, the terminal determines the candidate image selected by the selection operation as a target image file to be processed, and the target image file may be highlighted in the image file selection interface by darkening the brightness of the target image file or selecting the target image file in a frame, and the like.

For example, the user clicks an operation of "do the same style" under the selected pre-set image template as shown in FIG. 2A to trigger the synthesis trigger operation for the pre-set image template and trigger the terminal to jump to the image file selection interface corresponding to a particular position (such as an album or a folder) as shown in FIG. 2B. The user selects a candidate image as the target image file in the picture interface and clicks "OK", which can trigger the synthesis trigger operation for the target image file.

In step S330 to step S340, it is determined whether the target image file includes the target image content to be processed satisfying a requirement of synthesizing the predetermined type of image content, and the predetermined type of target image content In this embodiment is the "figure type of figure image content".

Step S330: Read a recognition result of a picture database. Specifically, image description information corresponding to the target image file is acquired. With reference to FIG. 2B, in response to the synthesis trigger operation for a target image file triggered by the user by a way, such as by clicking "OK" on the picture interface shown in FIG. 2B, the terminal may acquire the image description information stored associated with the target image file from the picture database.

Step S340: Determine whether figure image content is included. Specifically, based on the image description information, it is determined whether the target image file includes the target image content to be processed satisfying the requirement of synthesizing the predetermined type of image content. Namely, it is determined whether the image description information indicates whether the target image file includes the target image content to be processed satisfying the requirement of synthesizing the figure type of figure image content.

If so, that is, if the target image file includes the target image content to be processed, the process proceeds from step S350 to step S380.

If not, for example, the image description information is not acquired, the process proceeds to step S390.

In step S350 to step S380, synthesis pre-processing is performed on target image content to be processed in the target image file to generate an image to be synthesized only having the target image content to be processed.

Step S350: Extract a mask image using a MNN segmentation and extraction model. Namely, the detecting the target image content to be processed in the target image file to obtain contour information about the target image content to be processed specifically includes: inputting the target image file to an image segmentation and extraction model (the MNN segmentation and extraction model In this embodiment) for content segmentation and detection processing to obtain the mask image corresponding to the target image content to be processed.

Step S360: Filter and smooth an edge. Specifically, the step of the inputting the target image file to an image segmentation and extraction model for content segmentation and detection processing to obtain the mask image corresponding to the target image content to be processed includes: performing dimension transformation processing on the target image file to obtain a transformed image with a target dimension, and inputting the transformed image to the image segmentation and extraction model for content segmentation and detection processing to obtain the mask image corresponding to the target image content to be processed. Further, the dimension of the mask image is transformed to the dimension corresponding to the target image file to obtain the transformed mask image, and filtering and noise reduction processing is performed on the transformed mask image to obtain the target mask image.

Step S370: Perform mask superimposition to acquire an image to be synthesized.

Specifically, the extracting the target image content to be processed from the target image file based on the contour information to obtain the image to be synthesized only having the target image content to be processed includes: performing mask superimposition operation processing on the mask image and the target image file to obtain the image to be synthesized, the image to be synthesized including a content area corresponding to the target image content to be processed, and an outside of the content area in the image to be synthesized being a transparent area.

When step S360 is performed to obtain the target mask image, mask superimposition operation processing is performed on the target mask image and the target image file to obtain the image to be synthesized.

The mask superimposition operation processing may use a mask superimposition algorithm of opencv to extract the area of the original image.

Step S380: Obtain the image to be synthesized only having target image content to be processed after the preceding step S370 to step S370.

Step S390: Synthesize the template and the image. Specifically, content compensation and synthesis processing are performed on the image to be synthesized in the image pre-synthesis area to generate the target image fusing the template image content and the target image content to be processed. The target image synthesized in the terminal may be stored in a predetermined position, and the target image is presented on a target page. In this embodiment, the target image is displayed in an "editing" interface as shown in FIG. 2C, and the user may further edit the target image on the "editing" interface.

After step S340, the process may proceed to step S390.

Step S390: Extract a figure image feature using a MNN feature extraction model.

Namely, extracting an image content feature from a candidate image specifically includes inputting the candidate image to a content feature extraction model (such as the MNN feature extraction model) for content feature extraction processing to obtain the image content feature.

Step S3100: Determine whether there is the figure image feature.

Performing recognition processing based on the image content feature to obtain image description information specifically includes inputting the image content feature to a content feature recognition model for feature combination recognition processing to obtain the image description information. The image description information is used for indicating whether the candidate image includes the target image content to be processed satisfying the requirement of synthesizing the predetermined type of image content (i.e., the figure type of figure image content).

With reference to FIG. 5, the predetermined type of image content is the figure image content corresponding to the figure type. The image content features are the figure image features, such as the left eye, the right eye, the nose, the left half of the mouth, and the right half of the mouth, selected in frames in the middle image of FIG. 5. By combination recognition of these image content features, it can be determined that these features belong to the figure image feature selected in a frame in the right image of FIG. 5. Furthermore, the image description information may be generated to indicate that the candidate image includes the target image content to be processed satisfying the requirement of synthesizing the predetermined type of image content (i.e., the figure type of figure image content).

After step S3100, if so, that is, if the image description information indicates that the candidate image includes the target image content to be processed satisfying the requirement of synthesizing the predetermined type of image content (i.e., the figure type of figure image content), the process may proceed to step S350 and step S3111.

Step S3111: Store image description information in the database.

After step S3100, if not, for example, the image content feature is not extracted or it is determined that the extracted image content feature is not the figure image feature, the process proceeds to step S3112.

Step S3112: Detect whether the candidate image is a long graph. Specifically, the aspect ratio of the candidate image is detected. If the aspect ratio is higher than the predetermined threshold value, it is a long graph; otherwise, it is not a long graph.

If so, the process proceeds to step S3113. Otherwise, the process proceeds to step S3114.

Step S3113: Segment the image into sub-images. Specifically, cross-segmentation processing is performed on the candidate image according to a predetermined segmentation strategy to obtain at least two sub-images with an overlapping portion. Then, the process proceeds to step S390. At least two sub-images are inputted to the content feature extraction model (such as the MNN feature extraction model) for local content feature extraction processing to obtain the image content feature. For example, if it is detected that the aspect ratio of the candidate image on the left side of FIG. 6 is higher than the predetermined threshold value, the candidate image is segmented. With reference to FIG. 7, the candidate image on the left side in FIG. 6 is segmented to obtain 3 sub-images with overlapping portions shown on the right side in FIG. 7, and the aspect ratio of the sub-images is 4: 3. The sub-images are compressed into 320*320 tensors and then inputted to the MNN feature extraction model for content feature extraction processing. Then, the process proceeds to step S3110.

Step S3114: Determine that there is not the figure image content in the candidate picture.

In this embodiment, by applying the foregoing embodiments of this application, it is indicated that the following advantageous effects can be achieved.

The target image may be generated by adaptively fusing the pre-set image template and the figure image content as a whole. The two are independent from each other and not fused caused by simply adding mask processing, and Accordingly, the effects may be avoided. Furthermore, the image processing effect can be effectively improved. It simplifies the operation of matting editing in image fusion, and improves the user's utilization rate of the whole function and user experience. The dual model processing scheme of feature extraction and recognition ensures the accuracy of identifying the figure image content. By the recognition technology of long graph segmentation, the overall recognition accuracy is increased, avoiding the determination error of some figure image features.

Figure 11:
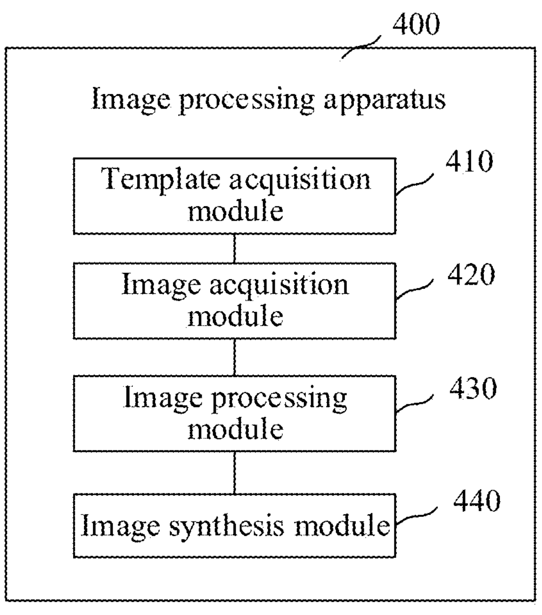
FIG. 11 shows a block diagram of an image processing apparatus according to another embodiment of this application.

To facilitate the image processing method provided by the embodiments of this application, the embodiments of this application further provide an image processing apparatus based on the image processing method described above. The meaning of the noun is the same as that in the above image processing method, and the specific implementation details may refer to the description in the method embodiments. FIG. 11 shows a block diagram of an image processing apparatus according to an embodiment of this application.

As shown in FIG. 11, an image processing apparatus 400 may include a template acquisition module 410, an image acquisition module 420, an image processing module 430, and an image synthesis module 440.

The template acquisition module 410 may be configured to acquire a pre-set image template, the pre-set image template including an image pre-synthesis area and template image content, and the image pre-synthesis area being used for synthesizing a predetermined type of image content. The image acquisition module 420 may be configured to determine a target image file to be processed. The image processing module 440 may be configured to perform synthesis pre-processing on target image content to be processed in the target image file to generate an image to be synthesized only having the target image content to be processed in response to that the target image file includes the target image content to be processed, the target image content to be processed being content satisfying a requirement of synthesizing the predetermined type of image content. The image synthesis module 440 may be configured to perform content compensation and synthesis processing on the image to be synthesized in the image pre-synthesis area to generate a target image fusing the template image content and the target image content to be processed.

In some embodiments of this application, the image acquisition module 420 is configured to determine a candidate image selected by a selection operation as the target image file to be processed in response to the selection operation for a candidate image. The image processing apparatus 400 further includes a content determination module, configured to acquire image description information corresponding to the target image file; and determine whether the target image file includes the target image content to be processed satisfying the requirement of synthesizing the predetermined type of image content based on the image description information.

In some embodiments of this application, the candidate image set includes the target image file, and the apparatus further includes an information extraction module, including: a content feature extraction unit, configured to extract an image content feature from a candidate image for each candidate image in the candidate image set; and a content feature recognition unit, configured to perform feature combination recognition processing based on the image content feature to obtain image description information corresponding to the candidate image, the image description information being used for indicating whether the image file includes the target image content to be processed satisfying the requirement of synthesizing the predetermined type of image content.

In some embodiments of this application, the content feature extraction unit is configured to input the candidate image to a content feature extraction model for content feature extraction processing to obtain the image content feature; the content feature recognition unit is configured to input the image content feature to a content feature recognition model for feature combination recognition processing to obtain the image description information.

In some embodiments of this application, the content feature extraction unit includes: a segmentation sub-unit, configured to perform cross-segmentation processing on the candidate image according to the predetermined segmentation strategy to obtain the at least two sub-images with an overlapping portion; and a feature extraction sub-unit, configured to input the at least two sub-images to the content feature extraction model for local content feature extraction processing to obtain the image content feature.

In some embodiments of this application, the segmentation sub-unit is configured to detect an aspect ratio of the candidate image; and perform cross-segmentation processing on the candidate image according to the predetermined segmentation strategy to obtain the at least two sub-images with an overlapping portion in response to that the aspect ratio is higher than a predetermined threshold value.

In some embodiments of this application, the image processing module includes: a detection unit, configured to detect the target image content to be processed in the target image file to obtain contour information about the target image content to be processed; and a pre- processing unit, configured to extract the target image content to be processed from the target image file based on the contour information to obtain the image to be synthesized only having the target image content to be processed.

In some embodiments of this application, the contour information is a mask image. The detection unit is configured to input the target image file to an image segmentation and extraction model for content segmentation and detection processing to obtain the mask image corresponding to the target image content to be processed, the mask image being an image for indicating a contour of the target image content to be processed.

In some embodiments of this application, the pre-processing unit is configured to perform mask superimposition operation processing on the mask image and the target image file to obtain the image to be synthesized, the image to be synthesized including a content area corresponding to the target image content to be processed, and an outside of the content area in the image to be synthesized being a transparent area.

In some embodiments of this application, the detection unit is configured to perform dimension transformation processing on the target image file to obtain a transformed image with a target dimension, and input the transformed image to the image segmentation and extraction model for content segmentation and detection processing to obtain the mask image corresponding to the target image content to be processed; and the pre-processing unit is configured to transform a dimension of the mask image to a dimension corresponding to the target image file to obtain a transformed mask image, perform filtering and noise reduction processing on the transformed mask image to obtain a target mask image, and perform mask superimposition operation processing on the target mask image and the target image file to obtain the image to be synthesized.

In some embodiments of this application, the image synthesis module is further configured to perform content compensation and synthesis processing on the image to be synthesized in the image pre-synthesis area to generate the target image fusing the template image content and the target image content to be processed, the content compensation and synthesis processing including content compensation processing and synthesis processing, the content compensation processing referring to supplementing and modifying image content, and the synthesis processing referring to a synthesis process of synthesizing at least two images into one image.

In some embodiments of this application, the image synthesis module includes a first synthesis unit, configured to acquire a pre-set content synthesis strategy corresponding to the pre-set image template; perform content compensation processing on the image to be synthesized and the template image content according to content compensation information in the pre-set content synthesis strategy to obtain the compensated image to be synthesized and the compensated template image content; and fuse the compensated image to be synthesized to the image pre-synthesis area to perform image synthesis on the compensated image to be synthesized and the compensated template image content.

In some embodiments of this application, the image synthesis module includes a second synthesis unit, configured to acquire image feature information about the image to be synthesized and acquire pre-set description information about the image pre-synthesis area; analyze based on the image feature information and the pre-set description information to obtain an image synthesis strategy for matching the pre-set image template and the image to be synthesized; perform content compensation processing on the image to be synthesized and the template image content according to content compensation information in the image synthesis strategy to obtain the compensated image to be synthesized and the compensated template image content; and fuse the compensated image to be synthesized to the image pre-synthesis area to perform image synthesis on the compensated image to be synthesized and the compensated template image content.

According to an embodiment of this application, the image processing apparatus includes: a template display module, configured to present an image synthesis interface, the image synthesis interface displaying a pre-set image template, the pre-set image template including an image pre-synthesis area and template image content, and the image pre-synthesis area being used for synthesizing a predetermined type of image content; and a target image synthesis module, configured to presenting a synthesized target image in response to a synthesis operation in the image synthesis interface, the target image being generated by fusing an image to be synthesized to the image pre-synthesis area, the image to be synthesized being generated by performing synthesis pre-processing on target image content to be processed in a target image file, the image to be synthesized only having the target image content to be processed, and the target image content to be processed satisfying a requirement of synthesizing the predetermined type of image content.

In some embodiments of this application, the target image synthesis module includes: a selection interface trigger unit, configured to display an image file selection interface in response to a synthesis trigger operation for the pre-set image template in the image synthesis interface, the displaying an image file selection interface displaying the target image file; and a synthesis trigger unit, configured to present the synthesized target image in response to the synthesis trigger operation for the target image file in the image file selection interface.

In some embodiments of this application, the synthesis trigger unit is configured to: highlight the target image file in response to a selection operation for a candidate image in the image file selection interface, the target image file being a candidate image selected by the selection operation; and present the synthesized target image in response to the synthesis trigger operation in the image file selection interface.

Further, in some embodiments of this application, the image processing apparatus includes: a template display module, configured to present an image synthesis interface, the image synthesis interface displaying a pre-set image template, the pre-set image template including an image pre-synthesis area and template image content, and the image pre-synthesis area being used for synthesizing a predetermined type of image content; and a target image synthesis module, configured to presenting a synthesized target image in response to a synthesis operation in the image synthesis interface, the target image being generated by fusing an image to be synthesized to the image pre-synthesis area, the image to be synthesized being generated by performing synthesis pre-processing on target image content to be processed in a target image file, the image to be synthesized only having the target image content to be processed, and the target image content to be processed satisfying a requirement of synthesizing the predetermined type of image content.

In some embodiments of this application, the target image synthesis module includes: a selection interface trigger unit, configured to display an image file selection interface in response to a synthesis trigger operation for the pre-set image template in the image synthesis interface, the displaying an image file selection interface displaying the target image file; and a synthesis trigger unit, configured to present the synthesized target image in response to the synthesis trigger operation for the target image file in the image file selection interface.

In some embodiments of this application, the synthesis trigger unit is configured to: highlight the target image file in response to a selection operation for a candidate image in the image file selection interface, the target image file being a candidate image selected by the selection operation; and present the synthesized target image in response to the synthesis trigger operation in the image file selection interface.

Although several modules or units of a device for action execution have been mentioned in the above detailed description, such a division is not mandatory. Indeed, the features and functions of two or more modules or units described above may be embodied in one module or unit according to the embodiments of this application. Conversely, the features and functions of one module or unit described above may be further divided to be embodied by more than one module or unit.

Figure 12:
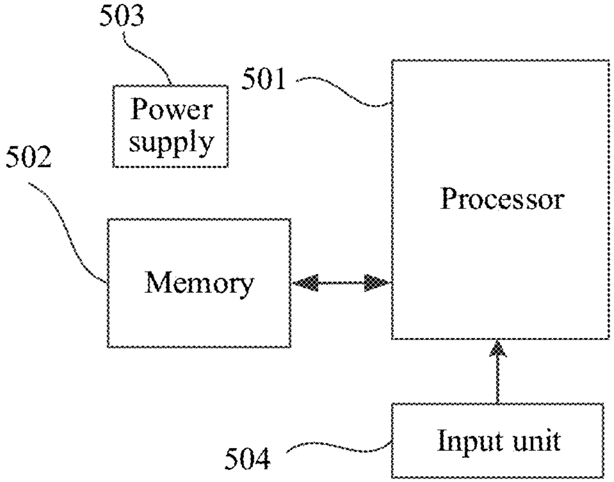
FIG. 12 shows a block diagram of an electronic device according to an embodiment of this application.

In addition, the embodiments of this application further provide an electronic device. The electronic device may be the terminal, or the server as shown in FIG. 12, which shows a schematic structural diagram of the electronic device involved in the embodiments of this application.

Specifically, the electronic device may include components, such as a processor 501 of one or more processing cores, a memory 502 of one or more computer-readable storage media, a power supply 503, and an input unit 504. It will be understood by those skilled in the art that the structure of the electronic device shown in FIG. 12 is not limiting the electronic device. Compared with the illustration, it may include more or fewer components, combine some components, or make a different arrangement of components.

The processor 501 is the control center of the electronic device and utilizes various interfaces and lines to connect various portions of the overall computer device to perform various functions and process data of the computer device to detect the electronic device by running or executing software programs and/or modules stored in the memory 502 and invoking data stored in the memory 502. In some embodiments, processor 501 may include one or more processing cores. Preferably, processor 501 may integrate an application processor and a modem processor. The application processor primarily processes operating systems, user pages, applications, and the like; the modem processor primarily processes wireless communication. It will be appreciated that the modem processor described above may not be integrated into processor 501.

Memory 502 may be configured to store a software program and a module. The processor 501 runs the software program and module stored in the memory 502 to perform various functional applications and data processing. Memory 502 may mainly include a storage program area and a storage data area. The storage program area may store an operating system, an application program required by at least one function (such as a sound playing function and an image playing function), and the like; the storage data area may store data and the like created according to the use of the computer device. In addition, memory 502 may include a high-speed random access memory and may further include a non-volatile memory, such as at least one disk storage device, a flash storage device, or other volatile solid-state storage devices. Accordingly, the memory 502 may further include a memory controller to provide the processor 501 with the access to the memory 502.

The electronic device further includes the power supply 503 to power the various components. Preferably, the power supply 503 may be logically connected to the processor 501 by a power management system to manage the functions, such as charging, discharging, and power consumption. Power supply 503 may further include any components, such as one or more of a direct or alternating current power supply, a recharging system, a power failure detection circuit, a power converter or inverter, and a power status indicator.

The electronic device may further include the input unit 504. The input unit 504 may be configured to receive the input numeric or character information and produce a keyboard, a mouse, an analog stick, optical or trackball signal inputs related to user settings and function control.

Although not shown, the electronic device may further include a display unit, which will not be described in detail herein. In particular, in the present embodiment, the processor 501 in the electronic device loads executable files corresponding to processes of one or more computer programs into the memory 502 according to the following instructions, and the processor 501 runs the computer programs stored in the memory 502 to realize various functions of the above embodiments of this application. For example, the processor 501 may perform:

acquiring a pre-set image template, the pre-set image template including an image pre-synthesis area and template image content, and the image pre-synthesis area being used for synthesizing a predetermined type of image content; determining a target image file to be processed; determining whether the target image file includes the target image content to be processed satisfying a requirement of synthesizing the predetermined type of image content; performing synthesis pre-processing on the target image content to be processed in the target image file to generate an image to be synthesized only having the target image content to be processed in response to that the target image file includes the target image content to be processed; and performing content compensation and synthesis processing on the image to be synthesized in the image pre-synthesis area to generate the target image fusing the template image content and the target image content to be processed.

It will be appreciated by those skilled in the art that all or part of the steps in various methods of the above embodiments may be performed by a computer program or by controlling relevant hardware through the computer program. The computer program may be stored in a computer-readable storage medium and loaded and executed by a processor.

The embodiment of this application further provides a computer-readable storage medium, storing a computer program, which can be loaded by a processor to perform the steps in any one of the methods provided in the embodiments of this application.

The computer-readable storage medium may include a read only memory (ROM), a random access memory (RAM), a disk, or a light disk.

Since the computer program stored in the computer-readable storage medium may execute the steps in any one of the methods provided by the embodiments of this application, the advantageous effects that can be realized by the methods provided by the embodiments of this application can be realized, which are described in detail in the preceding embodiments and will not be described in detail herein.

According to an aspect of this application, there is provided a computer program product or a computer program, including a computer instruction stored in a computer-readable storage medium. A processor of a computer device reads the computer instruction from the computer-readable storage medium, and the processor executes the computer instruction to cause the computer device to perform the method provided in various alternative implementations in the above embodiments of this application.

Other implementations of this application will be apparent to those skilled in the art from consideration of the specification and practice of the embodiments disclosed herein. This application is intended to cover any variations, use, or adaptive changes of this application. These variations, use, or adaptive changes follow the general principles of this application and include common knowledge or commonly used technical ways in the technical field that are not disclosed in this application.

It will be understood that this application is not limited to the embodiments described above and shown in the drawings, and that various modifications and changes can be made without departing from the scope thereof.

What is claimed is:

1. An image processing method, performed by a computer device, comprising:

acquiring a pre-set image template, the pre-set image template comprising an image pre- synthesis area, and the image pre-synthesis area being used for synthesizing a predetermined type of image content;

identifying a target image file;

performing synthesis pre-processing on target image content in the target image file to generate an image to be synthesized, the target image content being the predetermined type of image content;

performing content compensation processing on the image to be synthesized and the template image content according to content compensation information to obtain a compensated image to be synthesized and a compensated template image content; and fusing the compensated image to be synthesized to the image pre-synthesis area by performing image synthesis on the compensated image to be synthesized and the compensated template image content to generate a target image.

2. The method according to claim 1, wherein:

the pre-set image template further comprises template image content; and the template image content and the target image content to be processed are fused to generate the target image.

3. The method according to claim 1, wherein the identifying a target image file comprises:

determining a candidate image selected in response to a selection operation for a candidate image; and acquiring image description information corresponding to the target image file, and determining whether the target image file comprises the target image content being the predetermined type of image content based on the image description information.

4. The method according to claim 1, wherein a candidate image set comprises the target image file, and the method further comprises:

extracting an image content feature from each candidate image in the candidate image set; and performing feature combination recognition processing based on the image content feature to obtain image description information corresponding to the candidate image, the image description information indicating whether the image file comprises the target image content of the predetermined type of image content.

5. The method according to claim 4, wherein the extracting an image content feature from a candidate image comprises:

performing content extraction on the candidate image to obtain the image content feature; and the performing feature combination recognition processing based on the image content feature to obtain image description information corresponding to the candidate image comprises:

performing content feature recognition on the image content feature to obtain the image description information.

6. The method according to claim 5, wherein the performing content feature recognition on the image content feature to obtain the image description information comprises:

performing cross-segmentation processing on the candidate image according to a predetermined segmentation strategy to obtain at least two sub-images with an overlapping portion; and performing local content feature extraction on the at least two sub-images to obtain the image content feature.

7. The method according to claim 6, wherein the performing cross- segmentation processing on the candidate image according to a predetermined segmentation strategy to obtain at least two sub-images with an overlapping portion comprises:

detecting an aspect ratio of the candidate image; and performing cross-segmentation processing on the candidate image according to the predetermined segmentation strategy to obtain the at least two sub-images with an overlapping portion in response to that the aspect ratio is higher than a predetermined threshold value.

8. The method according to claim 1, wherein the performing synthesis pre- processing on target image content in the target image file to generate an image to be synthesized comprises:

detecting the target image content in the target image file to obtain contour information about the target image content; and extracting the target image content from the target image file based on the contour information to obtain the image to be synthesized.

9. The method according to claim 8, wherein the contour information is a mask image, and the detecting the target image content in the target image file to obtain contour information comprises:

performing content segmentation and detection on the target image file to obtain the mask image corresponding to the target image content, the mask image indicating a contour of the target image content.

10. The method according to claim 9, wherein the extracting the target image content from the target image file based on the contour information to obtain the image to be synthesized comprises:

performing mask superimposition on the mask image and the target image file to obtain the image to be synthesized, the image to be synthesized comprising a content area corresponding to the target image content, and an outside of the content area being a transparent area.

11. The method according to claim 10, wherein performing content segmentation and detection on the target image file to obtain the mask image corresponding to the target image content comprises:

performing dimension transformation processing on the target image file to obtain a transformed image with a target dimension, and performing content segmentation and detection on the transformed image to obtain the mask image corresponding to the target image content; and the performing mask superimposition on the mask image and the target image file to obtain the image to be synthesized comprises:

transforming a dimension of the mask image to a dimension corresponding to the target image file to obtain a transformed mask image, performing filtering and noise reduction on the transformed mask image to obtain a target mask image, and performing mask superimposition on the target mask image and the target image file to obtain the image to be synthesized.

12. The method according to claim 1, wherein:

the content compensation processing includes supplementing and modifying image content, and the content synthesis processing includes synthesizing at least two images into one image.

13. The method according to claim 12, further comprising:

acquiring a content synthesis strategy corresponding to the image template, wherein the content compensation information is included in the content synthesis strategy.

14. The method according to claim 12, further comprising:

acquiring image feature information about the image to be synthesized and acquiring description information about the image pre-synthesis area; and analyzing based on the image feature information and the description information to obtain an image synthesis strategy for matching the image template and the image to be synthesized, wherein the content compensation information is included in the content synthesis strategy.

15. A non-transitory computer-readable storage medium, storing thereon a computer program which, when executed by one or more processors of a computer, causes the computer to perform:

acquiring a pre-set image template, the pre-set image template comprising an image pre-synthesis area, and the image pre-synthesis area being used for synthesizing a predetermined type of image content;

identifying a target image file;

performing synthesis pre-processing on target image content in the target image file to generate an image to be synthesized, the target image content being the predetermined type of image content;

performing content compensation processing on the image to be synthesized and the template image content according to content compensation information to obtain a compensated image to be synthesized and a compensated template image content; and fusing the compensated image to be synthesized to the image pre-synthesis area by performing image synthesis on the compensated image to be synthesized and the compensated template image content to generate a target image.

16. The computer-readable storage medium according to claim 15, wherein the identifying a target image file comprises:

determining a candidate image selected in response to a selection operation for a candidate image; and acquiring image description information corresponding to the target image file, and determining whether the target image file comprises the target image content being the predetermined type of image content based on the image description information.

17. The computer-readable storage medium according to claim 15, wherein a candidate image set comprises the target image file, and the computer program further causes the one or more processors to perform:

extracting an image content feature from each candidate image in the candidate image set; and performing feature combination recognition processing based on the image content feature to obtain image description information corresponding to the candidate image, the image description information indicating whether the image file comprises the target image content of the predetermined type of image content.

18. The computer-readable storage medium according to claim 17, wherein the extracting an image content feature from a candidate image comprises:

performing content extraction on the candidate image to obtain the image content feature; and the performing feature combination recognition processing based on the image content feature to obtain image description information corresponding to the candidate image comprises:

performing content feature recognition on the image content feature to obtain the image description information.

19. An electronic device, comprising: one or more memories, the memories storing computer programs; and one or more processors, the processors reading the computer programs stored in the memories to perform:

acquiring a pre-set image template, the pre-set image template comprising an image pre- synthesis area and template image content, and the image pre-synthesis area being used for synthesizing a predetermined type of image content;

identifying a target image file;

performing synthesis pre-processing on target image content in the target image file to generate an image to be synthesized, the target image content being the predetermined type of image content;

performing content compensation processing on the image to be synthesized and the template image content according to content compensation information to obtain a compensated image to be synthesized and a compensated template image content; and fusing the compensated image to be synthesized to the image pre-synthesis area by performing image synthesis on the compensated image to be synthesized and the compensated template image content to generate a target image.

20. The electronic device according to claim 19, wherein the performing synthesis pre-processing on target image content in the target image file to generate an image to be synthesized comprises:

detecting the target image content in the target image file to obtain contour information about the target image content; and extracting the target image content from the target image file based on the contour information to obtain the image to be synthesized.

* * * * *